United States Patent
Kao et al.

(10) Patent No.: US 9,116,578 B2
(45) Date of Patent: Aug. 25, 2015

(54) OPTICAL DISTANCE DETERMINATION DEVICE, OPTICAL TOUCH MONITORING SYSTEM AND METHOD FOR MEASURING DISTANCE OF A TOUCH POINT ON AN OPTICAL TOUCH PANEL

(75) Inventors: Ming-Tsan Kao, Hsin-Chu (TW); Tzu-Yu Chen, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 1058 days.

(21) Appl. No.: 12/967,062

(22) Filed: Dec. 14, 2010

(65) Prior Publication Data
US 2011/0316814 A1    Dec. 29, 2011

(30) Foreign Application Priority Data
Jun. 28, 2010  (TW) ................. 99121043 A (51) Int. Cl.
G06F 3/042    (2006.01)
H04N 7/18    (2006.01)

(52) U.S. Cl.
CPC .... G06F 3/0428 (2013.01); *G06F 2203/04808* (2013.01)

(58) Field of Classification Search
CPC . G06F 3/0488; G06F 3/04883; G06F 3/0325; G06F 3/0425; G06F 3/0428; G06F 2203/04808
USPC ......................................... 345/179; 348/139
See application file for complete search history.

(56) References Cited

U.S. PATENT DOCUMENTS

| | | | | |
|---|---|---|---|---|
| 5,317,140 A | * | 5/1994 | Dunthorn | 250/221 |
| 7,442,914 B2 | | 10/2008 | Eliasson | |
| RE43,084 E | * | 1/2012 | Fujioka | 345/175 |
| 2003/0071858 A1 | * | 4/2003 | Morohoshi | 345/856 |
| 2010/0328244 A1 | * | 12/2010 | Lin et al. | 345/173 |

FOREIGN PATENT DOCUMENTS

| | | |
|---|---|---|
| JP | 2002268809 | 9/2002 |
| JP | 2002351615 | 12/2002 |
| JP | 20093575 | 1/2009 |

* cited by examiner

*Primary Examiner* — William Boddie
*Assistant Examiner* — Alecia D English
(74) *Attorney, Agent, or Firm* — Winston Hsu; Scott Margo (57) ABSTRACT

An optical distance determination device includes a first image sensor, an auxiliary image sensor, and a distance measuring module. The first image sensor is for capturing a first image comprising image information of an object. The auxiliary image sensor is for capturing an auxiliary image comprising image information of the object, and a physical distance between the first image sensor and the auxiliary image sensor. The distance measuring module is for calculating pixel distance of an image formation position of the object in the first image and the auxiliary image for calculating an approximate distance between the object and the first image sensor according to the pixel distance, the physical distance, and focal lengths of the first image sensor and the auxiliary image sensor.

16 Claims, 7 Drawing Sheets

OPTICAL DISTANCE DETERMINATION DEVICE, OPTICAL TOUCH MONITORING SYSTEM AND METHOD FOR MEASURING DISTANCE OF A TOUCH POINT ON AN OPTICAL TOUCH PANEL

BACKGROUND OF THE INVENTION

1. Field of the Invention

The present invention relates to optical touch display systems and methods, and more particularly to a multi-touch optical touch display system and related method that recognizes ghost points.

2. Description of the Prior Art

Current touch display technology is utilized in many types of electronic products, including automatic teller machines, handheld electronic devices, and displays. Touch display technology can be subdivided into resistive, capacitive, and optical touch. Resistive and capacitive touch display technologies utilize electric field variations on a touch display surface caused by an object contacting a sensor device to position the object. Optical touch display technologies utilize optical path blockages or optical image variations caused by an object moving on a surface of a touch display to position the object.

Figure 1:
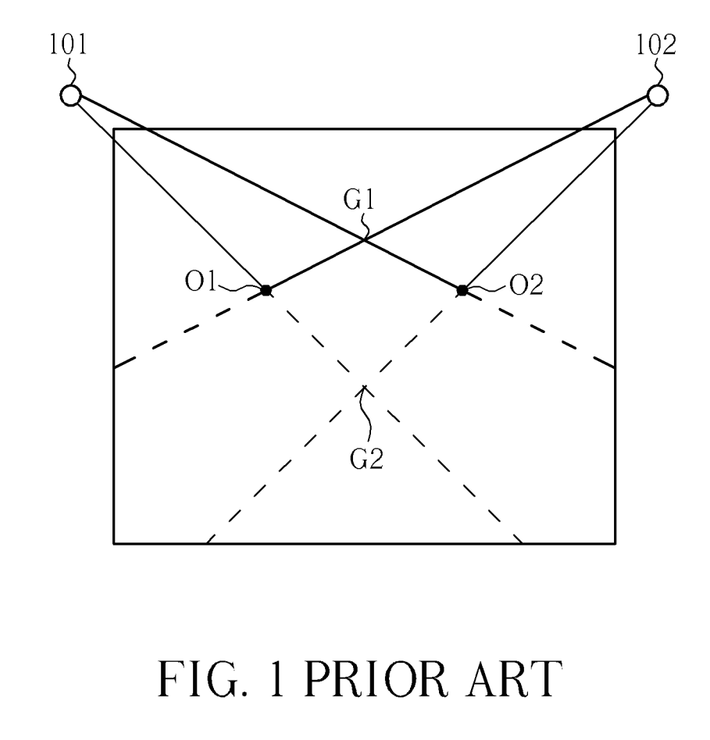
FIG. 1 is a diagram illustrating ghost points formed in an optical touch display performing multitouch detection due to blocking of multiple optical paths.

Optical touch display technology does not require special fabrication and components in display device manufacturing processes, so optical touch display manufacturing costs are typically lower than those of resistive or capacitive touch screens. However, optical touch displays are susceptible to detection errors when utilized in multitouch configurations, due to intersection points formed by blocking of multiple optical paths. Although the prior art may utilize images captured at different instants to determine true touch points, if an object being detected is static, the true touch points cannot be determined. Please refer to FIG. 1, which is a diagram illustrating ghost points formed in an optical touch display performing multitouch detection due to blocking of multiple optical paths. As shown in FIG. 1, optical paths of light emitted by light sources 101, 102 are blocked by objects O1, O2 being detected. Because the optical touch display of the prior art is only able to detect whether or not an optical path is blocked (and cannot determine distance to the object), the optical touch display not only finds the objects O1, O2, but also generates ghost points G1, G2 due to intersection points of the blocked optical paths.

SUMMARY OF THE INVENTION

According to an embodiment, an optical distance determination device comprises a first image sensor, an auxiliary image sensor, and a distance measuring module. The first image sensor is for capturing a first image comprising image information of an object. The auxiliary image sensor is for capturing an auxiliary image comprising image information of the object, and a physical distance between the first image sensor and the auxiliary image sensor. The distance measuring module is for calculating pixel distance of an image formation position of the object in the first image and the auxiliary image for calculating an approximate distance between the object and the first image sensor according to the pixel distance, the physical distance, and focal lengths of the first image sensor and the auxiliary image sensor.

According to an embodiment, an optical touch display system comprises a touch panel, a first image sensor, a second image sensor, an auxiliary image sensor, a coordinates calculation module, and a true image determination module. The touch panel is contactable by a plurality of objects. The first image sensor is for capturing a first image comprising image information of the plurality of objects on the touch panel. The second image sensor is for capturing a second image comprising image information of the plurality of objects on the touch panel. The auxiliary image sensor is for capturing an auxiliary image comprising image information of at least one target object of the plurality of objects on the touch panel, and a physical distance between the first image sensor and the auxiliary image sensor. The coordinates calculation module is for calculating a plurality of candidate coordinates of the plurality of objects comprising the target object according to image formation positions of the plurality of objects in the first image and the second image. The true image determination module is for calculating a pixel distance between the image formation positions of the target object in the first image and the auxiliary image, and selecting a set of candidate coordinates of the plurality of candidate coordinates as coordinates of the target object according to the pixel distance, the physical distance, and focal lengths of the first image sensor and the second image sensor.

According to an embodiment, a method of measuring distance in a touch panel comprises capturing a first image and a second image comprising image information of a plurality of objects from a first position and a second position located at different corners of the touch panel, respectively; capturing an auxiliary image comprising image information of at least one target object from an auxiliary position a physical distance away from the first position, wherein the first image and the auxiliary image are captured at focal lengths of a first image sensor and an auxiliary image sensor respectively; calculating a plurality of candidate coordinates of the plurality of objects comprising the target object according to image formation positions of the plurality of objects in the first image and the second image; and selecting a set of coordinates of the plurality of candidate coordinates as coordinates of the target object according to image formation positions of the target object in the first image and the auxiliary image, the physical distance between the first position and the auxiliary position, and the focal lengths of the first image sensor and the auxiliary image sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
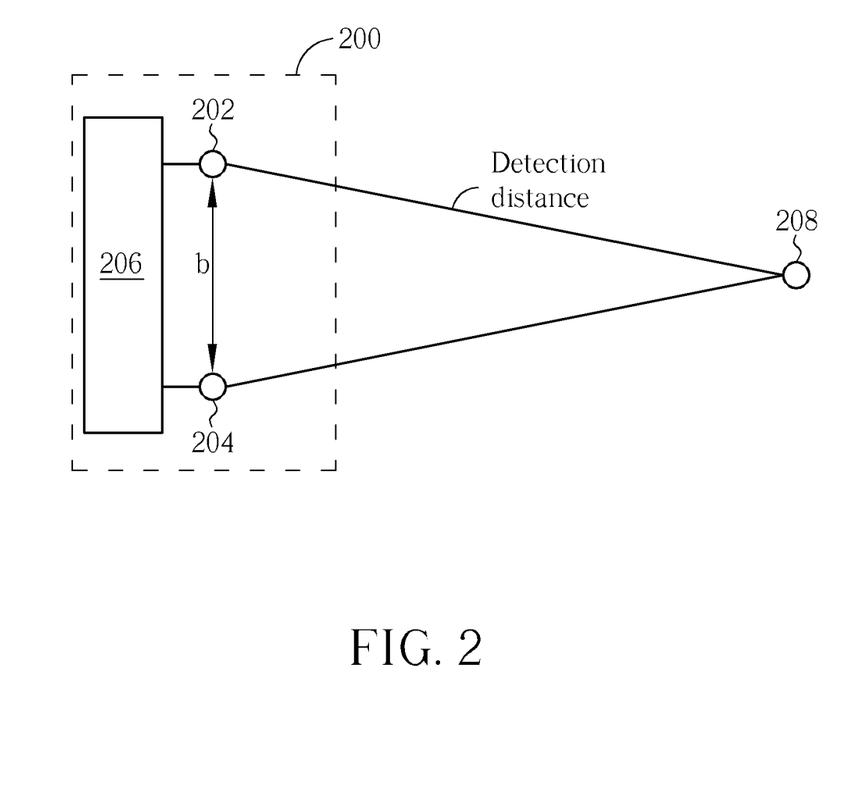
FIG. 2 is a diagram of an optical distance determination device according to an embodiment.

Please refer to FIG. 2, which is a diagram of an optical distance determination device 200 according to an embodiment. The optical distance determination device 200 comprises a first image sensor 202, an auxiliary image sensor 204, and a distance measuring module 206. The first image sensor 202 is for capturing a first image comprising an image of a detected object. The auxiliary image sensor 204 is for capturing an auxiliary image comprising an image of the detected object. The first image sensor 202 and the auxiliary image sensor 204 are separated by a physical distance b. Focal lengths f of the first image sensor 202 and the auxiliary image sensor 204 are the same. The first image sensor 202 and the auxiliary image sensor 204 have the same visual angle, pixel matrices of the first image sensor 202 and the auxiliary image sensor 204 have the same number of pixels, and each pixel has the same pixel width. The distance measuring module 206 is coupled to the first image sensor 202 and the auxiliary image sensor 204, and is utilized for calculating pixel distance d (shown in FIG. 3) of an image formation position of the detected object 208 in the first image and the auxiliary image, and calculating an approximate distance between the detected object 208 and the first image sensor 202 according to the pixel distance d, the physical distance b, and the focal lengths f.

The first image sensor 202 and the auxiliary image sensor 204 may directly output the captured first image and auxiliary image. The distance measuring module 206 directly calculates image formation positions of the detected object 208 in the first image and the auxiliary image according to the first image and the auxiliary image, so as to calculate the pixel distance d between the image formation positions of the detected object 208 in the first image and the auxiliary image. The first image sensor 202 and the auxiliary image sensor 204 may process the first image and the auxiliary image to calculate the image formation positions of the detected object 208 in the first image and the auxiliary image, and the distance measuring module 206 may receive the image formation positions for calculating the pixel distance d. Utilizing the first image sensor 202 and the auxiliary image sensor 204 to calculate the image formation positions of the detected object 208 directly greatly reduces amount of data the first image sensor 202 and the auxiliary image sensor 204 are required to output.

Figure 3:
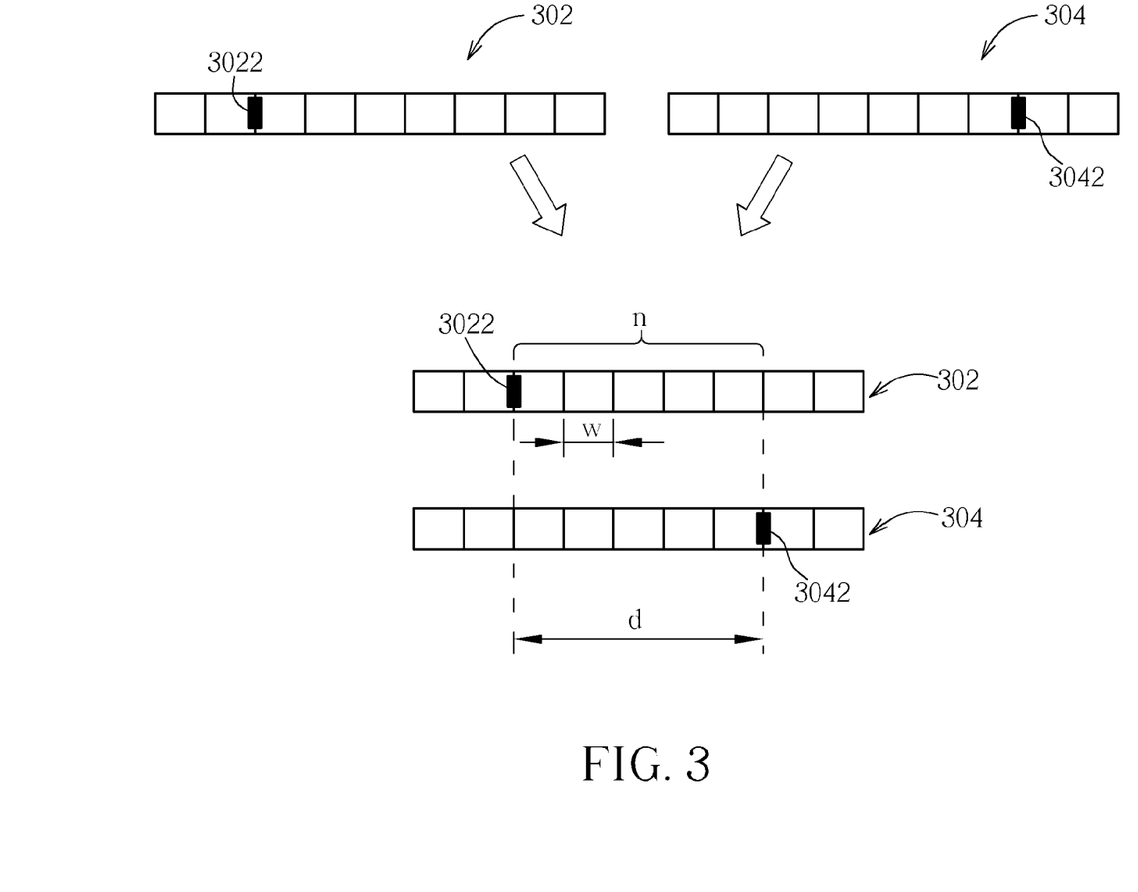
FIG. 3 is a diagram of the distance measuring module determining pixel distance according to image formation positions of the detected object in a first image and an auxiliary image.

Please refer to FIG. 3, which is a diagram of the distance measuring module 206 determining pixel distance d according to image formation positions 3022, 3042 of the detected object 208 in a first image 302 and an auxiliary image 304. As shown in FIG. 3, the pixel distance d represents distance between the image formation positions 3022, 3042 of the detected object 208 determined by the first image sensor 202 and the auxiliary image sensor 204. When the first image sensor 202 and the auxiliary image sensor 204 have the same visual angle, the pixel matrices of the first image sensor 202 and the auxiliary image sensor 204 have the same number of pixels, and each pixel has the same pixel width w, the pixel distance d equals the product of a number n of pixels between the image formation position 3022 of the first image 302 and the image formation position 3042 of the auxiliary image 304, and the pixel width w. The pixel width w may be measured as an integer number of pixels. The number n may be any real number of pixels.

In some embodiments, the first image sensor 202 and the auxiliary image sensor 204 may have different focal lengths. For example, when the first image sensor 202 has a focal length f1, and the auxiliary image sensor 204 has a focal length f2, a ratio of the focal length f2 to the focal length f1 may be utilized to correct the image formation position 3042 of the detected object 208 in the auxiliary image 304. For example, the ratio of the focal length f2 to the focal length f1 may be utilized to shift the image formation position 3042 of the detected object 208 in the auxiliary image 304 left or right. In this manner, the pixel distance d may be calculated according to the image formation position 3022 in the first image 302 and the corrected image formation position of the detected object 208 in the auxiliary image 304.

If the first image sensor 202 and the auxiliary image sensor 204 have different visual angles, the ratio of the visual angles of the first image sensor 202 and the auxiliary image sensor 204 may be utilized to correct the image formation position of the detected object 208 in the auxiliary image 304. For example, the ratio of the visual angles may be utilized to shift the image formation position 3042 of the detected object 208 in the auxiliary image 304 left or right. In this manner, the pixel distance d may be calculated according to the image formation position 3022 in the first image 302 and the corrected image formation position of the detected object 208 in the auxiliary image 304.

When the pixel matrices of the first image sensor 202 and the auxiliary image sensor 204 have different pixel widths, after directly calculating the image formation positions 3022, 3042 of the detected object 208 in the first image 302 and the auxiliary image 304, the pixel distance d may be calculated by taking the difference of the two image formation positions 3022, 3042.

When the first image sensor 202 and the auxiliary image sensor 204 have different focal lengths, visual angles, or pixel widths, calculation of the pixel distance d may be performed after first calibrating the information obtained by the auxiliary image sensor 204 based on the first image sensor 202, or by calibrating the information obtained by the first image sensor 202 based on the auxiliary sensor 204. Calibration techniques of this type are widely known among those of ordinary skill in the art, so further description thereof is omitted here.

Figure 4A:
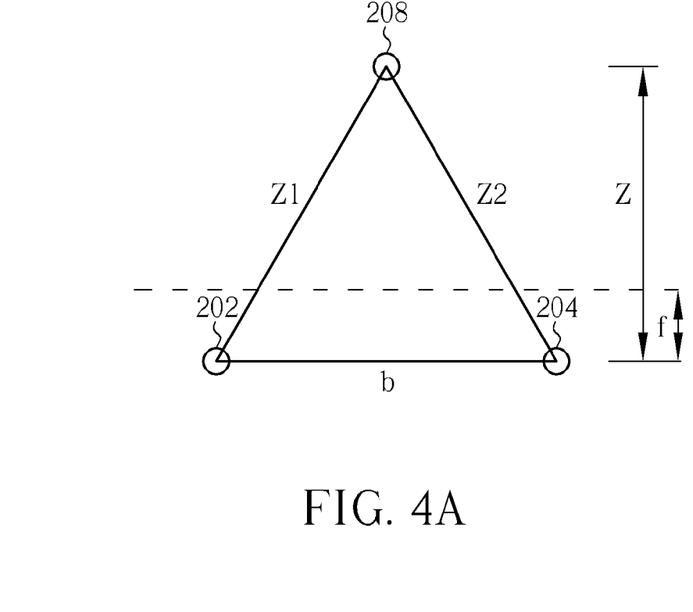
FIG. 4A and FIG. 4B are diagrams illustrating triangular relationships between the first image sensor, the auxiliary image sensor, and the detected object.
Figure 4B:
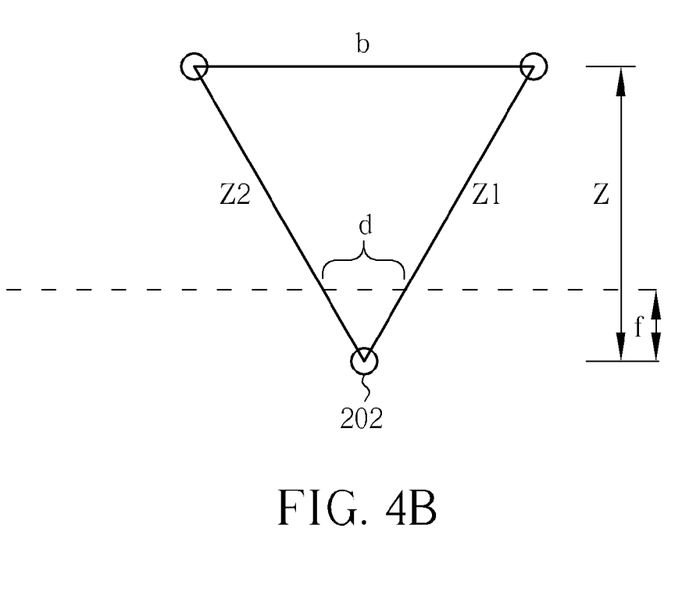

Please refer to FIG. 4A and FIG. 4B, which are diagrams illustrating triangular relationships between the first image sensor 202, the auxiliary image sensor 204, and the detected object 208. As shown in FIG. 4A, the first image sensor 202 and the auxiliary image sensor 204 are separated by a predetermined physical distance b, the first image sensor 202 and the detected object 208 are separated by a first distance Z1, and the auxiliary image sensor 204 and the detected object 208 are separated by a second distance Z2. If approximate distance Z is much greater than the physical distance b, then the first distance Z1 and the second distance Z2 are both approximately equal to the approximate distance Z. FIG. 4B is derived from FIG. 4A by moving the second distance Z2 of FIG. 4A to the left of the first distance Z1, such that the first distance Z1 and the second distance Z2 intersect at the location of the first image sensor 202. As shown in FIG. 4B, equation (1) below may be derived from the similar triangles principle. Thus, the pixel distance d, the physical distance b, and the focal length f may be used to obtain the approximate distance Z as follows:

$$d:b = f:Z \quad (1)$$
$$\Rightarrow Z = \frac{f \times b}{d} = \frac{f \times b}{n \times w}$$

where f represents the focal length of the first image sensor 202, b represents the physical distance between the first image sensor 202 and the auxiliary image sensor 204, d represents the pixel distance, n represents the number of pixels in the pixel matrices, and w represents pixel width of the pixels in the pixel matrices. The number n in equation (1) may be any real number.

In another embodiment of FIG. 2, focal lengths of the first image sensor 202 and the auxiliary image sensor 204 are different, but have a fixed relationship. Operation principles are thus the same as the embodiment of FIG. 2, and are not further described.

Figure 5:
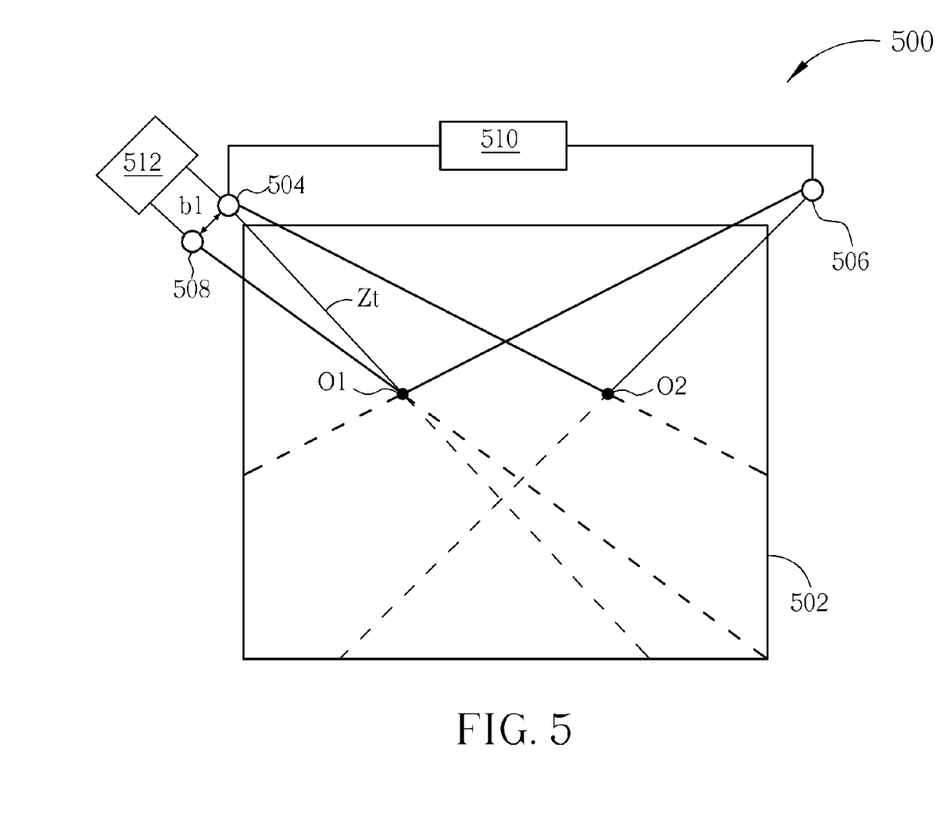
FIG. 5 is a diagram of an optical touch display system according to another embodiment.

Please refer to FIG. 5, which is a diagram of an optical touch display system 500 according to another embodiment. The optical touch display system 500 comprises a touch panel 502, a first image sensor 504, a second image sensor 506, an auxiliary image sensor 508, a coordinates calculation module 510, and a true image determination module 512. The touch panel 502 is contactable by a plurality of detected objects. As shown in FIG. 5, two detected objects O1, O2 contact the touch panel 502, but number of detected objects is not to be construed as limited to the two shown in the embodiment of FIG. 5. The first image sensor 504 is for capturing a first image comprising an image of the two detected objects O1, O2 on the touch panel 502. The second image sensor 506 is for capturing a second image comprising an image of the two objects O1, O2 on the touch panel 502. The auxiliary image sensor 508 is for capturing an auxiliary image comprising an image of at least one target object of the two objects O1, O2 on the touch panel, and also calculates a physical distance b1 between the first image sensor 504 and the auxiliary image sensor 508. Focal lengths f1 of the first image sensor 504 and the auxiliary image sensor 508 are the same. As shown in the embodiment of FIG. 5, the target object is the detected object O1, but the embodiment is not limited thereto. The coordinates calculation module 510 is coupled to the first image sensor 504 and the second image sensor 506 for calculating a plurality of candidate coordinates of the two detected objects O1, O2 comprising coordinates of the target object (O1) according to image formation positions of the two detected objects O1, O2 in the first image and the second image. The true image determination module 512 is coupled to the first image sensor 504 and the auxiliary image sensor 508 for calculating a pixel distance d1 between the image formation positions of the target object (O1) in the first image and the auxiliary image, and substituting the pixel distance d1, the physical distance b1, and focal lengths f1 into equation (1) to calculate an approximate distance Zt (much greater than the physical distance b1) between the target object and the first image sensor 502. Then, based on the approximate distance Zt, a set of candidate coordinates of the plurality of candidate coordinates is selected as the coordinates of the target object (O1). The first image sensor 504 and the auxiliary image sensor 508 have the same visual angle, and the first image sensor 504 and the auxiliary image sensor 508 are located at the same corner of the touch panel 502. Pixel matrices of the first image sensor 504 and the auxiliary image sensor 508 have the same number of pixels, and each pixel has the same pixel width. According to the same concept as illustrated in FIG. 3, it can be seen that the pixel distance d1 is equal to the product of the number n1 of pixels between the image formation positions of the target object in the first image and the auxiliary image and the pixel width w1.

The first image sensor 504 and the second image sensor 506 are located in different corners of the touch panel 502, and the coordinates calculation module 510 utilizes triangulation to calculate the plurality of candidate coordinates of the detected objects O1, O2 on the touch panel 502 according to information obtained from the image formation positions of the detected objects O1, O2 in the first image and the second image.

In another embodiment of FIG. 5, the first image sensor 504 and the auxiliary image sensor 508 have different focal lengths, but the focal lengths of the first image sensor 504 and the auxiliary image sensor 508 have a fixed relationship. Thus, operation principles thereof are the same as described above for FIG. 5, and are not repeated here.

Figure 6:
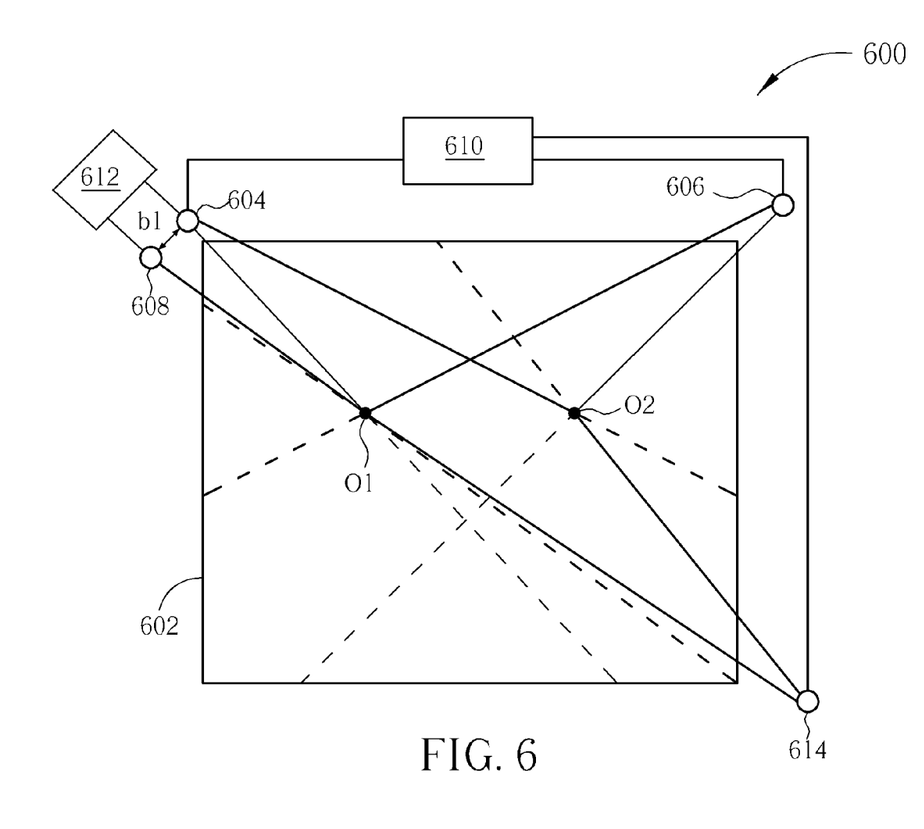
FIG. 6 is a diagram illustrating an optical touch display system according to another embodiment.

Please refer to FIG. 6, which is a diagram illustrating an optical touch display system 600 according to another embodiment. The optical touch display system 600 comprises a touch panel 602, a first image sensor 604, a second image sensor 606, an auxiliary image sensor 608, a coordinates calculation module 610, and a true image determination module 612, and a third image sensor 614. The optical touch display system 600 shown in FIG. 6 is different form the optical touch display system 500 shown in FIG. 5 in that the optical touch display system 600 further comprises the third image sensor 614 utilized for capturing a third image comprising an image of the detected objects O1, O2 on the touch panel 602. The third image sensor 614, the first image sensor 604, and the second image sensor 606 are all located at different positions. The coordinates calculation module 610 is coupled to the first image sensor 604, the second image sensor 606, and the third image sensor 614, and utilizes triangulation for calculating the plurality of candidate coordinates of the detected objects O1, O2 according to the image formation positions of the detected objects O1, O2 in the first image, the second image, and the third image. Other than the above differences, the optical touch display system 600 is similar in function to the optical touch display system 500, and description of the same operating principles is not repeated.

In another embodiment of FIG. 6, the first image sensor 604 and the auxiliary image sensor 608 have different focal lengths, but the focal lengths of the first image sensor 604 and the auxiliary image sensor 608 have a fixed relationship. Thus, operation principles thereof are the same as described above for FIG. 6, and are not repeated here.

Figure 7:
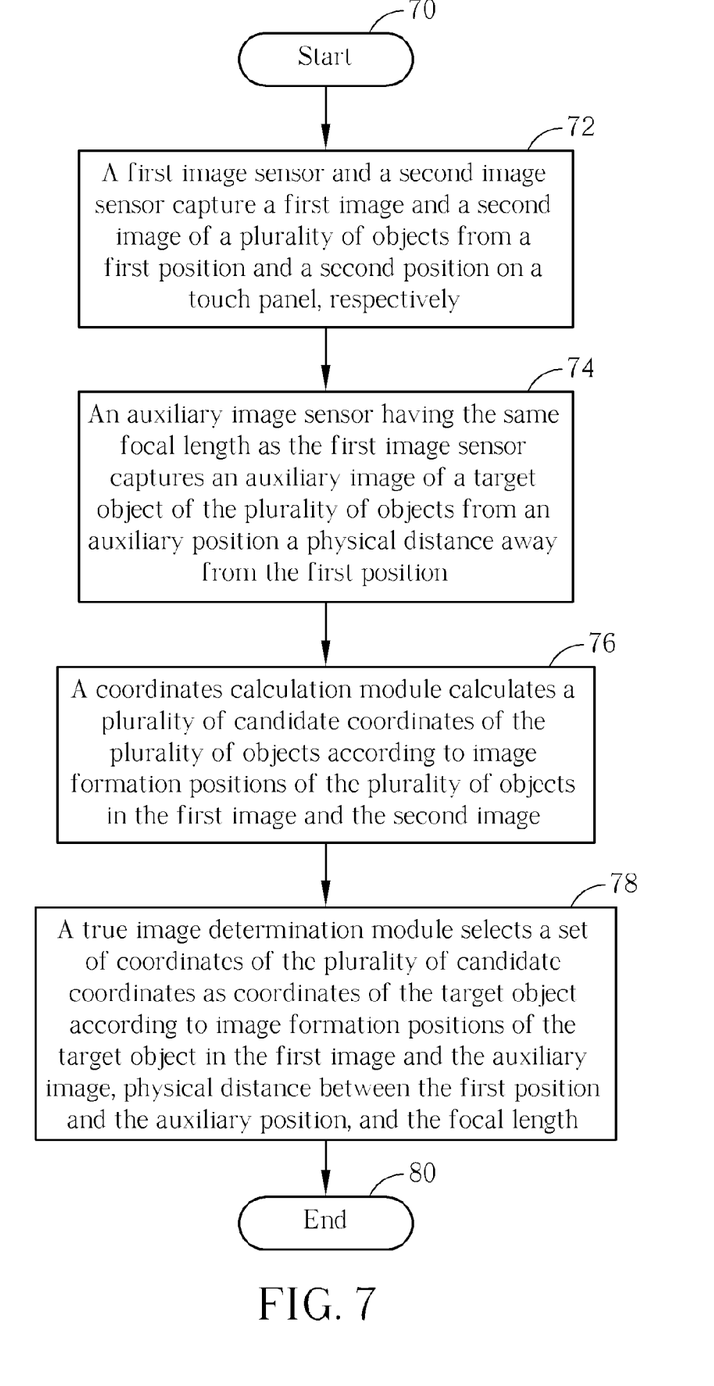
FIG. 7 is a flowchart diagram of a method of measuring distance in an optical touch display according to an embodiment.

Please refer to FIG. 7, which is a flowchart diagram of a method of measuring distance in an optical touch display according to an embodiment. The method shown in FIG. 7 is illustrated with reference to the optical touch display system 500 of FIG. 5, and comprises the following steps:

Step 70: Start;

Step 72: The first image sensor 504 and the second image sensor 506 capture a first image and a second image of the detected objects O1, O2 from a first position and a second position of the touch screen 502, wherein the first position and the second position are located at different corners of the touch screen 502;

Step 74: The auxiliary image sensor 508 captures an auxiliary image comprising an image of the target object (O1) of the detected objects O1, O2 from an auxiliary position a physical distance b1 away from the first position, wherein the auxiliary image sensor 508 and the first image sensor 504 have the same focal length;

Step 76: The coordinates calculation module 510 calculates a plurality of candidate coordinates of the detected objects O1, O2 comprising the target object (O1) according to image formation positions of the detected objects O1, O2 in the first image and the second image;

Step 78: The true image determination module 512 selects a set of coordinates of the plurality of candidate coordinates as coordinates of the target object (O1) according to the image formation positions of the target object (O1) in the first image and the auxiliary image, the physical distance b1 between the first position and the auxiliary position, and the focal length f1; and Step 80: End.

In Step 72 and Step 74, the first image sensor 504 and the auxiliary image sensor 508 capture the first image and the auxiliary image from the same visual angle, and the first image sensor 504 and the auxiliary image sensor 508 are located at the same corner of the touch panel 502. The first image and the auxiliary image have the same horizontal pixel resolution, and each pixel of the first image and the auxiliary image has the same width. In Step 76, the coordinates calculation module 510 utilizes triangulation to calculate the plurality of candidate coordinates of the detected objects O1, O2 on the touch screen 502 according to information obtained from the image formation positions of the detected objects O1, O2 in the first image and the second image. In Step 78, the true image determination module 512 obtains the pixel distance d1 according to the image formation positions of the target object (O1) in the first image and the auxiliary image, then substitutes the pixel distance d1, the physical distance b1, and the focal length f1 into equation (1) to calculate an approximate distance Zt between the target object and the first image sensor 502. A set of coordinates of the plurality of candidate coordinates is selected as coordinates of the target object (O1) according to the approximate distance Zt.

The optical distance determination device, the optical touch display systems, and the method of measuring distance provided by the embodiments described above utilize the images captured by the auxiliary image sensor and the first image sensor to triangulate the approximate distance between the detected object(s) and the first image sensor. According to the approximate distance between the detected object(s) and the first image sensor, the true image determination module determines ghost point coordinates of the plurality of candidate coordinates generated by the coordinates calculation module according to the image formation positions of the detected object(s) in the first image and the second image. Thus, the optical distance determination device, the optical touch display system, and the method of measuring distance provided can effectively solve the problem of the ghost points formed due to intersection points of blocked optical paths caused when using optical touch technology to process multitouch input.

Those skilled in the art will readily observe that numerous modifications and alterations of the device and method may be made while retaining the teachings of the invention.

What is claimed is:

1. An optical touch display system comprising:
a touch panel contactable by a plurality of objects;
a first image sensor for capturing a first image comprising image information of the plurality of objects on the touch panel;
a second image sensor for capturing a second image comprising image information of the plurality of objects on the touch panel;
an auxiliary image sensor for capturing an auxiliary image comprising image information of at least one target object of the plurality of objects on the touch panel, and a physical distance between the first image sensor and the auxiliary image sensor;
a coordinates calculation module for calculating a plurality of candidate coordinates of the plurality of objects comprising the target object according to image formation positions of the plurality of objects in the first image and the second image; and
a true image determination module for calculating a pixel distance between the image formation positions of the target object in the first image and the auxiliary image, and selecting a set of candidate coordinates of the plurality of candidate coordinates as coordinates of the target object according to the pixel distance, the physical distance, and focal lengths of the first image sensor and the second image sensor;
wherein the first image sensor and the auxiliary image sensor have the same focal length, ratio of the focal length and the pixel distance is approximately equal to ratio of the physical distance and distance between the plurality of objects and the first image sensor, and the true image determination module selects the set of candidate coordinates from the plurality of candidate coordinates as the coordinates of the plurality of objects through the physical distance according to the ratio of the focal length and the pixel distance.

2. The optical touch display system of claim 1, wherein the first image sensor and the auxiliary image sensor have the same visual angle, pixel matrices of the first image sensor and the auxiliary image sensor have the same number of pixels, and each pixel has the same pixel width.

3. The optical touch display system of claim 2, wherein the pixel distance represents the product of difference between locations of the plurality of objects in the first image and the auxiliary image and the pixel width.

4. The optical touch display system of claim 1, wherein the true image determination module calculates approximate distance between the plurality of objects and the first image sensor through the physical distance according to the ratio of the focal length and the pixel distance, and selects the set of candidate coordinates from the plurality of candidate coordinates as the coordinates of the plurality of objects according to the approximate distance.

5. The optical touch display system of claim 1, wherein the first image sensor and the second image sensor are located at different corners of the touch panel, and the first image sensor and the auxiliary image sensor are located at the same corner of the touch panel.

6. The optical touch display system of claim 1, wherein the first image sensor, the second image sensor, and the auxiliary image sensor each further comprise a projection light source for providing light need when capturing images.

7. The optical touch display system of claim 1, wherein the first image sensor, the second image sensor, and the auxiliary image sensor capture the first image, the second image, and the auxiliary image simultaneously.

8. The optical touch display system of claim 1, wherein the coordinates calculation module utilizes triangulation to calculate the plurality of candidate coordinates of the plurality of objects through image formation positions of the plurality of objects in the first image and the second image.

9. The optical touch display system of claim 1, further comprising a third image sensor for capturing a third image comprising image information of the plurality of objects on the touch panel, wherein the coordinates calculation module utilizes triangulation to calculate the plurality of candidate coordinates according to image formation positions of the plurality of objects in the first image, the second image, and the third image.

10. The optical touch display system of claim 1, wherein when the first image sensor and the auxiliary image sensor have different visual angles or different focal lengths, the first image sensor is utilized as a reference for calibrating image formation positions of the plurality of objects obtained by the auxiliary image sensor, or the auxiliary image sensor is utilized as a reference for calibrating image formation positions of the plurality of objects obtained by the first image sensor.

11. A method of measuring distance in a touch panel, the method comprising:
   capturing a first image and a second image comprising image information of a plurality of objects from a first position and a second position located at different corners of the touch panel, respectively;
   capturing an auxiliary image comprising image information of at least one target object from an auxiliary position a physical distance away from the first position, wherein the first image and the auxiliary image are captured at a first focal length and a second focal length of a first image sensor and an auxiliary image sensor respectively;
   calculating a plurality of candidate coordinates of the plurality of objects comprising the target object according to image formation positions of the plurality of objects in the first image and the second image; and
   selecting a set of coordinates of the plurality of candidate coordinates as coordinates of the target object according to image formation positions of the target object in the first image and the auxiliary image, the physical distance between the first position and the auxiliary position, and the focal lengths of the first image sensor and the auxiliary image sensor;
   wherein the first image and the auxiliary image are captured from the same visual angle, horizontal pixel resolutions of the first image and the auxiliary image are the same, and each pixel has the same width and wherein the first focal length and the second focal length are the same, and the set of coordinates of the plurality of candidate coordinates are selected as the coordinates of the target object according to a pixel distance obtained by calculating the product of difference between pixel positions of the target object in the first image and the auxiliary image and pixel width.

12. The method of claim 11, wherein the set of coordinates of the plurality of candidate coordinates are selected through the physical distance according to ratio of the same focal length and the pixel distance, and the ratio of the same focal length and the pixel distance is approximately equal to ratio of the physical distance and distance between the target object and the first position.

13. The method of claim 12, wherein the approximate distance between the target object and the first position is calculated through the physical distance according to the ratio of the same focal length and the pixel distance, and the set of coordinates of the plurality of candidate coordinates are selected according to the approximate distance.

14. The method of claim 11, wherein the first image, the second image, and the auxiliary image are captured approximately simultaneously.

15. The method of claim 11, wherein triangulation is utilized to calculate the plurality of candidate coordinates of the plurality of objects according to image formation positions of the plurality of objects in the first image and the second image.

16. A method of measuring distance in a touch panel, the method comprising:
   capturing a first image and a second image comprising image information of a plurality of objects from a first position and a second position located at different corners of the touch panel, respectively;
   capturing an auxiliary image comprising image information of at least one target object from an auxiliary position a physical distance away from the first position, wherein the first image and the auxiliary image are captured at a first focal length and a second focal length of a first image sensor and an auxiliary image sensor respectively;
   calculating a plurality of candidate coordinates of the plurality of objects comprising the target object according to image formation positions of the plurality of objects in the first image and the second image; and
   selecting a set of coordinates of the plurality of candidate coordinates as coordinates of the target object according to image formation positions of the target object in the first image and the auxiliary image, the physical distance between the first position and the auxiliary position, and the focal lengths of the first image sensor and the auxiliary image sensor;
   wherein focal lengths of the first image sensor and the auxiliary image sensor are the same, distance between the target object and the first position is calculated according to the following formulae:

$$Z = \frac{fb}{d}; \text{ and}$$
$$d = nw;$$

where Z represents the distance between the target object and the first position, f represents the same focal length of the first image sensor and the auxiliary image sensor utilized for capturing the first image and the auxiliary image, b represents the physical distance between the first position and the auxiliary position, n represents integer pixel distance between image formation positions of the target object in the first image and the auxiliary image, and w represents unit width of each pixel; and
   selecting the set of coordinates of the plurality of candidate coordinates as the coordinates of the target object is performed according to the formulae.

* * * * *